US012798954B2

(12) United States Patent
Cotti

(10) Patent No.: US 12,798,954 B2
(45) Date of Patent: Nov. 17, 2026

(54) SADDLE FOR RIDING AND PACK ANIMALS AND METHOD FOR PRODUCING SAME

(71) Applicant: Alfons Cotti, Sur (CH)

(72) Inventor: Alfons Cotti, Sur (CH)

(73) Assignee: Alfons Cotti, Sur (CH)

( * ) Notice: Subject to any disclaimer, the term of this patent is extended or adjusted under 35 U.S.C. 154(b) by 1070 days.

(21) Appl. No.: 17/604,566

(22) PCT Filed: Apr. 16, 2020

(86) PCT No.: PCT/EP2020/025171
§ 371 (c)(1),
(2) Date: Oct. 18, 2021

(87) PCT Pub. No.: WO2020/211980
PCT Pub. Date: Oct. 22, 2020

(65) Prior Publication Data

US 2022/0194779 A1 Jun. 23, 2022

(30) Foreign Application Priority Data

Apr. 16, 2019 (EP) .................................... 19020293

(51) Int. Cl.
*B68C 1/02* (2006.01)

(52) U.S. Cl.
CPC ................ *B68C 1/025* (2013.01); *B68C 1/02* (2013.01)

(58) Field of Classification Search
CPC ..... B68C 1/025; B68C 1/04; B68C 2001/042; B68C 1/10
See application file for complete search history.

(56) References Cited

U.S. PATENT DOCUMENTS

X9253 I1 * 11/1835 Hickman .................. B68C 1/10 54/44.4
2,229 A * 8/1841 Mardock .................. B68C 1/10 54/44.4

(Continued)

FOREIGN PATENT DOCUMENTS

DE 20 2010 010 215 U1 11/2011
WO 2014/145911 A1 9/2014

OTHER PUBLICATIONS

Oct. 9, 2020 International Search Report issued in International Patent Application No. PCT/EP2020/025171.

(Continued)

*Primary Examiner* — Son T Nguyen
(74) *Attorney, Agent, or Firm* — Oliff PLC

(57) ABSTRACT

A saddle tree for a riding saddle has rear, middle, and front sections. The saddle tree has at least two flat panels projecting from the rear through the middle into the front section, as well as a frame element structure having at least one rear bridge element interconnecting the two panels in the rear section, and a front bridge element interconnecting the two panels in the front section. The connection of the panels via the rear bridge element is largely designed to be rigid. The panels in the rear section are substantially and relatively immovable. The connection of the panels via the front bridge element is movable so that the panels in the region of the front section and optionally also in the middle section can be deflected by bending and/or torsion out of a rest position defined with respect to the region of the panels in the rear section.

17 Claims, 9 Drawing Sheets

(56) References Cited

U.S. PATENT DOCUMENTS

| | | | | | |
|---|---|---|---|---|---|
| 8,454 | A * | 10/1851 | Salomon | B68C 1/10 | 54/44.4 |
| 53,854 | A * | 4/1866 | Miller | B68C 1/10 | 54/44.4 |
| 77,849 | A * | 5/1868 | Steele | B68C 1/10 | 54/44.4 |
| 148,379 | A * | 3/1874 | Nunamacker | B68C 1/10 | 54/44.4 |
| 155,897 | A * | 10/1874 | Sommerville | B68C 1/10 | 54/44.4 |
| 288,026 | A * | 11/1883 | Comstock | B68C 1/10 | 54/44.4 |
| 544,602 | A | 8/1895 | Thierry | | |
| 568,939 | A * | 10/1896 | Davis | B68C 1/10 | 54/46.1 |
| 827,506 | A * | 7/1906 | Cox | B68C 1/10 | 54/44.4 |
| 854,086 | A * | 5/1907 | Gillespie | B68C 1/10 | 54/44.4 |
| 1,155,465 | A | 10/1915 | Beal | | |
| 1,301,838 | A * | 4/1919 | Guerrero | B68C 1/10 | 54/44.4 |
| 6,453,652 | B1 * | 9/2002 | Hennig | B68C 1/025 | 54/44.1 |
| 2017/0291809 | A1 * | 10/2017 | Coffin | B68C 1/025 | |

OTHER PUBLICATIONS

Sep. 28, 2021 International Preliminary Report on Patentability issued in International Patent Application No. PCT/EP2020/025171.

* cited by examiner

SADDLE FOR RIDING AND PACK ANIMALS AND METHOD FOR PRODUCING SAME

TECHNICAL FIELD

The invention relates to the field of saddles for riding and pack animals, in particular for horses, to components thereof and to a method for producing same.

PRIOR ART

There are many different embodiments of saddles and carrying devices for riding and pack animals. On account of the individual anatomy of the animals to which the saddle or the corresponding carrying device is intended to be attached, said saddle or carrying device can either be manufactured in a manner in which a shape and size fits the majority of animals or can easily be adapted thereto, or they are custom-made individually for each of the animals. Customized production of saddles and carrying devices has many advantages over standardized products, in particular they are more pleasant for the animal to wear. The disadvantage of custom-made products resides in the fact that they have to be adapted individually to each animal, and this ultimately means that the manufacturer of the saddle or of the carrying device has to see the animal, take measurements and adapt the saddle or the carrying device thereto. A multiplicity of methods are described in this regard in the prior art. Older methods for producing custom-made saddles require the manufacturer to have special capabilities, and more recent methods use modern 3D scanners and also 3D printing technology. Both of these methods and thus also the products produced therefrom are therefore expensive and are not widely accessible.

A further disadvantage both with mass-produced and with custom-made saddles is that they are generally made too stiff and therefore do not optimally reproduce the movement of the riding animal. Particularly in the shoulder region of the riding animal, i.e., for example, a horse, a rigid design of the saddle tree or of the saddle leads to the saddle tree bars not resting optimally on the back of the riding animal in each position thereof. This leads to instability of the saddle on the riding animal and is therefore often compensated for by the saddle being strapped more tightly onto the riding animal. This in turn can lead to pressure points and abrasions on the back or on the girth area, which is unpleasant for the animal and may cause harm to it.

SUMMARY OF THE INVENTION

It is therefore the object of the present invention to provide a saddle or a carrying device which can be produced in a simple manner and which are custom-made directly on the riding or pack animal. It is thereby ensured that the matching shape of the saddle or of the carrying device that typically rests on the back of the riding or pack animal via the saddle tree is optimally adapted to the back of the animal. This in turn prevents the back of the riding animal from being wrongly loaded when subjected to a load, for example during riding of the riding animal, and pressure points arising thereon which are unpleasant for the animal and may cause harm.

It is furthermore the object of the present invention to provide a saddle tree and finally a saddle or a carrying device, in particular a riding saddle, which, in comparison to mass-produced saddles or carrying devices, rests better on the back of the animal and leads to more stability for the rider or for the load on the back of the animal and therefore causes less harm to the animal.

According to the invention, the object is achieved by a saddle or a carrying device which comprises a saddle tree as claimed in claim 1 or a component of a saddle tree obtainable from a method as claimed in claim 11. In comparison to known custom-made saddles or carrying devices from the prior art, such a saddle or carrying device can be produced very simply and cost-effectively. Furthermore, the saddle tree bars of the saddle tree can be optimally adapted to the back of the riding or pack animal, and therefore they rest better on that region of the back of the animal which is suitable for carrying loads. The saddle tree bars here can be dimensioned in respect of their base area in such a manner that the supporting surface of the saddle or of the carrying device on the back of the animal via the saddle tree bars is as large as possible, as a result of which the load distribution is improved. By means of the saddle tree bars which are preferably bendable, or flexible or pliable and which can be influenced by the selection of the material for the production thereof, the saddle tree bars and therefore the saddle or the carrying device for the most part rest permanently on the back of the riding or pack animal, even during the movement of said animal, which in turn improves the load distribution and furthermore leads to the saddle or the carrying device not slipping on the animal during use, for example during riding.

The subject matter of the present invention is therefore a saddle tree for a saddle, in particular a riding saddle, which has a rear, a middle and a front section. With regard to the riding or pack animal for which the saddle or the carrying device is provided, the rear section is located in the rear region of the back of the animal and the front section in the front region which is closer to the head of the animal. The sections of the saddle tree as used here are not sharply delimited and are not necessarily in a length ratio to one another. On the contrary, the division of the saddle tree into sections serves for easier understanding of the invention.

The saddle tree comprises at least two flat saddle tree bars each having an inner side for placing onto the back of an animal, and an outer side, wherein the saddle tree bars project from the rear section of the saddle tree through the middle section into the front section, and a frame element construction which has at least one rear bridge element which connects the two saddle tree bars to each other in the rear section of the saddle tree, and a front bridge element which connects the two saddle tree bars to each other in the front section of the saddle tree. The connection of the saddle tree bars here via the rear bridge element is substantially rigid. The saddle tree bars are therefore substantially immovable with respect to each other in the rear section. In comparison to the connection via the rear bridge element, the connection of the saddle tree bars via the front bridge element is movable, and therefore the saddle tree bars in the region of the front section and optionally also of the middle section of the saddle tree are deflectable by bending and/or torsion out of a rest position defined with respect to that region of the saddle tree bars in the rear section of the saddle tree.

The rest position corresponds to the position of the saddle tree bars in the region of the front and/or the middle section of the saddle tree with respect to the position of the saddle tree bars in the region of the substantially rigid rear section if no external forces, for example caused by the movement of the animal, act on the saddle tree bars.

The saddle tree bars are generally substantially flat bodies or have at least a substantially flat inner side for contact with the back of the animal. Depending on the anatomy of the animal, to which the saddle tree bars are adapted, said inner sides can be substantially flat or else slightly curved. A bending movement of the saddle tree bars in the front and/or middle section of the saddle tree is understood here as meaning a movement in which said sections are moved out of the rest position in such a manner that a surface normal of the inner sides, as seen in the longitudinal direction, is tilted substantially rearward or forward. The bending movement takes place here relative to the immovable regions of the saddle tree bars in the rear section of the saddle tree that are connected rigidly to each other by the bridge element.

A torsional movement is understood as meaning a twisting of the saddle tree bars in the region of the front and optionally at least partially of the middle section of the saddle tree out of the rest position, in which a surface normal of the inner sides in said regions is tilted to the side, i.e. is tilted essentially about an imaginary axis defined parallel to the longitudinal direction. The twisting of the saddle tree bars in the front and/or middle section takes place here relative to the non-moving regions of the saddle tree bars in the rear section of the saddle tree.

The saddle tree is substantially symmetrical, with this being understood in conjunction with the present invention to the effect that the saddle tree, in the state ready for use on the riding or pack animal, has components which substantially correspond to one another and are formed mirror-symmetrically with respect to one another on both sides of an imaginary mirror plane in the longitudinal direction and perpendicularly through the animal.

This is expedient since a riding or pack animal also has a certain symmetry if an imaginary mirror plane is placed perpendicularly through the spinal column thereof. Of course, it is clear to a person skilled in the art that no back of a riding or pack animal has a perfect symmetry and, since the saddle tree according to the present invention can be individually adapted to the back of a riding or pack animal, the saddle tree also generally does not have perfect symmetry.

When a riding animal is mentioned in the present document, unless noted differently, this also includes pack animals which can carry any load instead of a rider. Furthermore, the term saddle, unless noted differently, also in general includes carrying devices for loads. The saddle tree, the method for producing same and the saddle according to the present invention are suitable in particular for riding animals, such as horses, and for carrying a rider.

Saddle Tree Bars

The saddle tree bars are flexible in particular in the front section of the saddle tree, i.e. in the shoulder region of the riding animal, and therefore, during movements which are produced by the riding animal in the region of the supporting surface of the saddle tree bars on the back of the riding animal, said saddle tree bars go along with said movements and, in the process, essentially remain in contact with the riding animal. As large a supporting surface as possible of the saddle tree bars on the back of the riding animal has the advantage that the saddle tree and, as a result, ultimately also the saddle has a more stable seat on the back of the riding animal and thereby slips less easily. Since the movement of the riding animal is pronounced in particular in the shoulder region, it is particularly advantageous that the saddle tree bars are configured flexibly in the region of the front section of the saddle tree.

Flexibly here means that a saddle tree bar which is secured in the region of the rear section of the saddle tree and to which a force is applied at the opposite free end, i.e. in the region of the front section of the saddle tree, is deflectable about an angle, in particular in such a manner that, when the force stops, the saddle tree bar returns again into the original shape, preferably without plastic deformation occurring. In particular, such an angle lies in the range from 0.5 to 3°, in particular 0.7 to 2°, preferably in the range of approximately 1°. With a conventional length of a saddle tree bar, as would be used, for example, for a full-grown riding horse, i.e. with a length in the range from 45 to 65 cm, such a movement would lead to a deflection of the front end of the saddle tree bar out of the plane of the saddle tree bar by approximately 1 to 5 cm, in particular 2 to 3 cm. This movability is sufficient, for example in the case of horses, in order to absorb their movement in the region of the front section of the saddle tree.

A saddle tree bar which has this type of flexibility can undertake the bending movement and/or torsional movement that is essential for the operation of the saddle tree bar according to the invention and is perpendicular to the surface of the saddle tree bar. This flexibility is particularly relevant in the region of the front section of the saddle tree. Since, however, the saddle tree bars are preferably integral and are composed in particular of a single material, this movement or this movability can also extend into the middle section of the saddle tree. Furthermore, it is preferred that the saddle tree bar can undertake both the movement perpendicular to its surface and also the torsional movement.

In the rear section of the saddle tree, the saddle tree bars can optionally be configured to be stiffer or substantially rigid since, in this region of the back of the riding animal, the relative movement of the saddle tree bars with respect to each other is smaller than in the shoulder region. In addition, the saddle tree bars in this region are connected to each other substantially rigidly by the rear bridge element, which leads to an increased rigidity in this region. The stiffening of the saddle tree bars in the rear section of the saddle tree can additionally be undertaken, for example, by inserting a rail made of a stiffer material into the rear region of the saddle tree bar, i.e., for example, a bar or a strip of a material of less flexibility than the material of the saddle tree bars. Furthermore, the stiffening in the rear section can also be undertaken by the layer thickness of the saddle tree bar being increased in this region, or by the saddle tree bar being partially fiber-reinforced. However, the increased rigidity of the saddle tree bars in the region of the rear section of the saddle tree is preferably produced exclusively by the connection of the two saddle tree bars by the rear bridge element.

The saddle tree bars can basically be formed from any material which permits the desired manner of flexibility. In conjunction with the present invention which, inter alia, also comprises a simple method for producing a saddle tree adapted individually to the back of a riding animal, the saddle tree bars are composed of a material which can be shaped to the back of the riding animal and then cured.

Such a material is typically a chemically crosslinking material or a thermoplastic material. If the material is a chemically crosslinking material, this is applied to the back of the riding animal in particular within the open period of the material and then cures in this position. Suitable chemically crosslinking materials are typically two-component compositions on the basis of polyurethane, polyurethane hybrids, silicone, acrylate, epoxy resins or other resins. Hot- or UV-curing compositions on the chemical basis mentioned would also be conceivable.

The material for the saddle tree bars is preferably a thermoplastic material since this can be processed particularly simply and, in conjunction with the method described below, which is likewise the subject matter of the present invention, has substantial advantages. Since the saddle tree bars are preferably shaped on the back of the riding animal, a thermoplastic material is suitable which can be shaped at a temperature at which burns do not occur on the back of the riding animal. Nevertheless, the intention is that the saddle tree bars remain stable during use of the riding saddle and that they are not deformed due to action of heat, for example due to the body temperature of the riding animal, solar insolation or rubbing. Furthermore, it should be noted that, during the molding of the saddle tree bars on the back of the riding animal, use is made typically or due to the method of a layer or underlayer between the riding animal and the moldable material of the saddle tree bars such that the riding animal does not come directly into contact with the warm or hot material during the molding. Therefore, depending on the underlayer, use can also be made of a thermoplastic material which has a higher softening point.

A thermoplastic material which can be deformed at temperatures between 40 and 100° C., in particular between 50 and 80° C., is particularly suitable. For example, thermoplastic materials as are commercially available from Thermoworx under www.thermoworx.com are suitable.

In order to influence the stability and/or the rigidity, the saddle tree bars can be reinforced in their interior or on their surface, at least over parts. This can be undertaken, for example, by inserting or applying a fiber material, such as carbon fibers or glass fibers in the form of a woven or nonwoven material or as fiber strands or similar. Other reinforcements, such as the insertion of armoring or the application of an outer layer made of a stiffer material than the material of the saddle tree bars, are also conceivable.

With regard to their shape or their outline, the saddle tree bars are configured in such a manner that they substantially rest on that region of the back of the riding animal which is suitable for carrying loads. This region appears somewhat different for each riding animal, but generally extends on both sides of the spinal column of the riding animal from the middle or rear back toward the shoulder of the riding animal. In the case of a horse, this region is recognized by a person skilled in the art and referred to as a saddle area.

The two saddle tree bars of the saddle tree are connected to each other in the rear section of the saddle tree. The connection of the saddle tree bars is intended to be situated here in the rear section since the relative movement of the two saddle tree bars with respect to each other is smallest there. The connection of the saddle tree bars there can be undertaken substantially stiffly or rigidly. The connection of the saddle tree bars in the rear section is undertaken via a rear bridge element. Said rear bridge element can be connected to the saddle tree bars in any way, i.e., for example, can be adhesively bonded, screwed, riveted, welded, clamped or connected in an integrally bonded manner.

In a preferred embodiment, the rear bridge element comprises a region which is formed from an identical material to the saddle tree bars, or is composed of said material, and is connected to the saddle tree bars in an integrally bonded manner. This is possible, for example, if the saddle tree bars and the rear bridge element are formed from an identical thermoplastic material and are connected to each other as soon as during the first shaping, or, during or after the curing of the thermoplastic material, the latter is softened or liquified by heating of the surface via which the saddle tree bars are intended to be connected to the rear bridge element, and the individual parts are joined to one another. Joining of the rear bridge element to the saddle tree bars during the first shaping is also possible if a chemically crosslinking material is used. If the rear bridge element is intended to be mounted on the saddle tree bars only after the first shaping, or if saddle tree bars and bridge element are composed of different materials, they are typically mechanically connected to one another or adhesively bonded to one another.

The rear bridge element can be configured basically as desired as long as it fulfills the purpose of connecting the two saddle tree bars substantially rigidly to each other. For example, the rear bridge element is configured in such a manner that it comprises a seat shell, a component thereof or a device for attaching a seat shell for the rider. The rear bridge element can also be designed as a seat shell or as a component thereof.

Furthermore, for the additional stiffening and stability of the saddle tree, the rear bridge element, in particular if, like the saddle tree bars, it is composed of a thermoplastic material, can have an additional reinforcement or armoring in the interior or on its surface. This can typically be a rod or a strip of metal or of a composite material.

Frame Elements

As described above, the saddle tree according to the invention has a frame element construction with a rear and a front bridge element which in each case connect the two saddle tree bars to each other.

The frame element construction here typically comprises one or more frame elements. Optionally, the rear bridge element and the front bridge element can be connected to each other via such frame elements, but this is dependent on the embodiment of the invention.

Since it is essential for the saddle tree according to the invention, as described previously, that the connection of the saddle tree bars via the rear bridge element is substantially rigid and, in comparison to the connection via the rear bridge element, the connection of the saddle tree bars via the front bridge element is movable, the frame elements are configured in such a manner that this different movability of the saddle tree bars in the region of the rear and of the front bridge element is possible.

The entire frame element construction is therefore constructed in such a way that it connects the two saddle tree bars to each other such that the described bending and/or torsional movement of the saddle tree bars is possible in the region of front and optionally also in the middle section of the saddle tree. This movement of the saddle tree bars is reversible, that is to say that the saddle tree bars return into their original position if the force which has caused the bending and/or torsional movement stops. The restoring force which pushes the saddle tree bars back into their original position can be achieved, on the one hand, by the saddle tree bars being manufactured from an elastically bendable material. On the other hand or in addition, the restoring force can be assisted or exerted passively or actively by the frame element construction. This can likewise be achieved, for example, by the selection of the material of the frame element construction, the material strength and the geometry, but is achieved in particular by the use of joints and/or spring elements in the frame construction.

In particular, the frame element construction has at least four or six frame elements, wherein said frame elements are each configured substantially identically in pairs because of the symmetry of the saddle tree.

The frame elements can be rigid bars or rods made of metal, plastic, wood or a composite material, for example a carbon- or glass-fiber-reinforced plastic, or can be manufactured from any combinations of these materials. The frame elements are preferably metal bars which, at least in sections, have threads for the assembly of the saddle tree, or are directly threaded rods made of metal.

In a first preferred embodiment of the invention, the rear bridge element and the front bridge element are not connected to each other directly via frame elements. In this embodiment, the connection of the rear bridge element to the front bridge element is undertaken via the saddle tree bars, wherein, in this case, the saddle tree bars have a reinforcement, as has been described above, preferably at least in the middle section of the saddle tree or in the region between the front and the rear bridge element.

In this embodiment, the front bridge element comprises two first frame elements which are connected to the saddle tree bars in the region of the middle section of the saddle tree and each lead along the saddle tree bars to the front section or beyond the latter and are supported in the front section of the saddle tree on the saddle tree bars. Furthermore, each of the first frame elements is connected in the front section of the saddle tree or in an extension thereof to a second frame element which protrudes from the outer side of the saddle tree bar. The two second frame elements are finally connected to each other via a connecting element. The connecting element typically extends here in a transverse direction with respect to the saddle tree.

In another embodiment of the invention, the rear bridge element and the front bridge element are connected to each other via frame elements.

In this case, two first frame elements each extend on both sides of the mirror plane from the rear bridge element along the saddle tree bars into the front section of the saddle tree. The first frame elements are each connected here in the rear section of the saddle tree to the rear bridge element on each side thereof, i.e., looking at the saddle tree from above, they are connected to the rear bridge element on the right and left, or in the left and in the right region, thereof. They extend in particular from the rear section of the saddle tree in each case along the saddle tree bar toward the front section of the saddle tree or beyond the latter and are supported in the front section of the saddle tree on the saddle tree bars.

Irrespective of the embodiment, the first frame elements are connected to the saddle tree bars or to the rear bridge element in particular mechanically, that is to say, the frame elements are screwed or plugged, for example, to the saddle tree bars or to the bridge element. For example, the first frame elements have a thread in the region of the middle or rear section of the saddle tree and are thereby screwed directly into previously provided bores on the saddle tree bars or in the rear bridge element. It is also possible to embed the first frame elements directly into the material of the rear bridge element during the forming of the saddle tree bars or of the rear bridge element. This is possible in particular if the saddle tree bars and/or the rear bridge element are manufactured from a thermoplastic material. In this case, the first frame elements can also be fastened by heating said material and molding or enclosing the ends of said frame elements with further thermoplastic material.

The first frame elements can furthermore be connected by eyelets, threaded sleeves or joint ends being attached to the saddle tree bars or to the rear bridge element and the first frame elements being fastened thereto. For example, short bars can be attached to the rear bridge element, the short bars only just protruding therefrom and at the protruding ends each having a ball or a ball socket of a ball and socket joint, with which the first frame elements are then attached to a correspondingly matching joint head in each case.

The first frame elements are particularly preferably in each case embedded or molded directly into the material of the saddle tree bars or of the rear bridge element and/or are enclosed by such material.

If the first frame elements are connected to the rear bridge element, threaded sleeves are preferably inserted in the rear bridge element during the shaping thereof and are used to connect the first frame elements to the rear bridge element in each case via a joint.

If the rear bridge element is composed, for example, of a metal or if it has a reinforcement or armoring of metal in the interior or on the surface, the threaded sleeves for the frame elements can be welded to said reinforcement or fastened mechanically thereto. This can impart additional stability to the entire saddle tree and/or can be of advantage in terms of construction.

The joint via which the first frame element is connected to the rear bridge element is particularly preferably an axial ball and socket joint. The frame elements thereby obtain some play and, during the manufacturing of the saddle tree, can be optimally adapted to the back of, for example, the riding animal, in the method described later.

Other joints, such as hinge joints or the use of a flexible material in this region are also possible.

In both embodiments described, the first frame elements extend in particular along the saddle tree bars to the front section of the saddle tree or beyond the latter. The first frame elements are supported here on the saddle tree bars. This support should not be rigid since the saddle tree bars are intended to absorb the movement on the back of the riding animal. In particular, the support is undertaken via one or more guide elements, for example guide eyelets or guide sleeves, which are attached rigidly to the saddle tree bars and through which the first frame elements run.

As a result, the first frame elements each permit a relative forward and rearward movement or the mentioned bending and/or torsional movement of the saddle tree bars. The guide elements can be configured as desired. A sleeve made of metal or plastic can preferably be incorporated into the moldable material directly during the shaping of the saddle tree bars or can be fixed subsequently with the same material to the saddle tree bar. This is easily possible if the material is a thermoplastic material since it can be softened by renewed and only very local heating and can be connected to a support for the sleeve likewise in an integrally bonded manner.

The first frame elements can furthermore comprise, in at least one region, wings which prevent twisting of the frame elements in relation to the saddle tree bars.

In the two above-mentioned embodiments, the first frame elements are each connected to a second frame element in the region of the front section of the saddle tree bars or in an extension thereof. Said second frame elements protrude from the surface of the saddle tree bars and are connected to one another in the region facing away from the saddle tree bar via a connecting element which, in a simplest embodiment, can typically extend perpendicularly to the plane of symmetry of the saddle tree. The protruding of the second frame elements should be understood here as meaning that the second frame elements preferably generally face away from the surface of the saddle tree bars. Most preferably, the two second frame elements are closer to each other in the region of the saddle tree bars than in the region of the connecting element. In other words, the direct line (air line) between the connecting points of the second frame elements to the first frame elements is shorter than the direct line between the connecting points of the second frame elements to the connecting element of the front bridge element.

The frame element construction of the saddle tree can comprise further frame elements than those described above, which, for example, provide the saddle tree with more rigidity or else carry out other functions. In particular, the frame element construction in each case comprises two third frame elements.

In particular, the frame element construction in each case has, on both sides, a third frame element which projects from the saddle tree bar in the region of the rear or of the middle section of the saddle tree into the front section and can be connected there directly or indirectly to the front bridge element.

In the first preferred embodiment, as has been previously described, the frame element construction has two third frame elements which extend from the saddle tree bars in the middle region of the saddle tree into the front region and protrude in particular slightly, i.e. that is to say at a shallow angle, from the saddle tree bars and are preferably connected to the front bridge element in the region of the connecting element. This connection can be undertaken directly via the connecting element, that is to say, the third frame element is connected to the connecting element, or the connection is undertaken via a different material, in particular thermoplastic material, which is fastened to the third frame element and to the connecting element. This connection is undertaken preferably by the connecting element and the third frame element being at least partially enclosed by thermoplastic material and being connected to each other via the latter. Most preferably, this is the same thermoplastic material from which the saddle tree bars are also manufactured.

In the second embodiment, as has been described previously, in each case a third frame element leads back into the rear bridge element and is connected there to the latter.

The third frame elements can be connected to the saddle tree bars or to the rear bridge element basically in the same manner as described above for the connection of the first frame elements to the rear bridge element, for example also embedded in the material of the saddle tree bars or of the rear bridge element or fastened to an optional reinforcement or armoring.

It is important for the present invention that all the frame elements are selected and configured in such a manner that they can absorb the movements which are produced by the riding animal in the region of the supporting surface of the saddle tree bars on the back of the riding animal. During the movement which is produced by the riding animal in the region of the supporting surface of the saddle tree bars on the back of the riding animal, the radius of movement of the connecting point of the first frame element to the second frame element is intended typically to be larger than the radius of movement of the connecting point of the second frame element to the connecting element. As a result, the saddle tree absorbs the movement of the riding animal and prevents said movement from being fully transmitted to the rider. In order to achieve this, the frame elements have to cooperate in such a manner that the movement of the saddle tree bars onto the frame elements is spring-suspended. In principle, the second and third frame elements can be designed in the same manner as the first frame element.

In order to achieve an optimum spring suspension of the entire frame element construction, the second frame elements preferably each comprise a spring element or consist thereof. Most preferably, the two second frame elements are spring elements. In particular, gas-filled compression springs as are commercially available are suitable for this purpose.

An optimum movability and spring suspension of the entire frame element construction and therefore of the entire saddle tree can also be achieved or assisted by the connections between the frame elements to one another or to the connecting element or to the saddle tree bars or to the rear bridge element each extending via joints, in particular via hinge joints or ball and socket joints or functionally identical alternatives.

Preferably, the connecting points of the first frame elements to the second frame elements and/or the connecting points of the second frame elements to the connecting element, and in particular in the second embodiment the connecting points of the first frame elements to the rear bridge element, have joints, in particular ball and socket joints. As a result, on the one hand, the flexibility of the entire saddle tree during the use thereof is increased, and, on the other hand, the joints facilitate the fixing of the frame element construction to the saddle tree bars in the production method described later.

The frame element construction or parts thereof can be configured as a single part or can be present as a premanufactured component consisting of the individual components. This can be undertaken, for example, by said components being manufactured from an identical material or by them being provided as described above and enclosed by a material, for example by a thermoplastic material, as has been described previously.

In the second embodiment of the invention, the rear bridge element, the third frame elements and the front bridge element can be configured as a single part. In this embodiment, this is easily possible since the two bridge elements and the third frame elements are typically connected rigidly to one another. In particular by packing the third frame element, preferably into a thermoplastic material, as is used for the saddle tree bars and in particular also as a component of the rear bridge element and if the rear bridge element comprises a blank shape for a seat or consists thereof, the rear bridge element and the third frame element form an optimum blank shape for the seat of the saddle.

If the various components of the frame element construction are configured as a single part, this has the advantage that said component of the saddle tree can typically be premanufactured, optionally also mechanically, and the production process for the saddle tree is thereby facilitated. For example, the rear bridge element, the third frame elements and the front bridge element could be produced as a single part by injection molding. If a material of high strength and good mechanical properties, for example polyamide, is used here, the use of the third frame element and of the front bridge element of metal could be dispensed with. The premanufactured component would therefore simply have to have fastening points for the first and second frame elements and for further optional elements, and it has to be possible to fasten the premanufactured component to the saddle tree bars in the method described below.

Optional Features

The saddle tree according to the invention can have further optional features and components. In particular, the saddle tree comprises mechanical fastening elements for girth rigging and stirrups, in particular supports for them. The fastening elements are preferably connected directly to the saddle tree and/or to the frame element construction in order to ensure that the entire construction has good stability. Such fastening elements can be mechanically fastened to various points of the saddle tree, for example can be screwed, riveted or adhesively bonded or welded thereto.

Furthermore, frame elements can also take on the function of the fastening elements, or vice versa. It is thus possible for the third frame elements to take on a structural function, in particular for increasing the rigidity of the saddle tree, and at the same time to take on supports for the stirrups or further optional features.

The supports for the stirrups are preferably connected to the third frame elements or to fastening elements provided specifically for this purpose, directly to the saddle tree bars in the region of the middle or rear section of the saddle tree or to the rear bridge element. As a result, the force which the rider exerts on the stirrups is admitted into the middle or the rear section of the riding saddle. The optimum movability of the saddle tree bars in the region of the front or else in regions of the middle section of the saddle tree is thus maintained. As a support for the stirrups, the saddle tree, if the support is not attached to a frame element, can comprise metal bars which are connected in particular rigidly to the saddle tree bars or to the rear bridge element. In general, like the frame elements, they can be attached to the saddle tree bars or to the rear bridge element, i.e. typically via threaded sleeves or by direct embedding of one of their ends in the material from which the saddle tree or components thereof are manufactured, in particular therefore thermoplastic material.

For the girth rigging, separate supports can likewise be attached to the saddle tree, i.e., for example, also to the rear bridge element or to the saddle tree bars. However, the girth rigging, like the above support for the stirrups, is preferably fastened to the third frame element. Most preferably, it extends here, starting from the third frame element or a fastening means attached specifically for this purpose, between the saddle tree bars and a padding which lies between the saddle tree bars and the back of the animal during the use of the saddle tree. This ensures the full movability of the saddle tree bars in the region of the front and optionally of the middle section of the saddle tree.

The present invention furthermore relates to a saddle, in particular to a riding saddle comprising the saddle tree described previously.

In addition to the saddle tree and the optional elements which are described above, such a riding saddle can comprise further elements, as are also used in the case of riding saddles from the prior art and as are known to a person skilled in the art. Such further elements are typically a seat for the rider or a device for securing other loads, a padding in the regions which are in contact with the riding animal and the rider, the described mechanical fastening elements for girth rigging and stirrups and the like, and a covering of the saddle with a cover, and finally also decorative elements.

Depending on the embodiment of the invention, as described above, the seat for the rider is formed in conjunction with the rear bridge element. The rear bridge element can thus comprise a seat shell or is designed as a seat shell. In that embodiment in which the rear bridge element, the third frame elements and the front bridge element are formed as a single part, all of said elements can together form a seat shell. This seat shell is in particular in the manner of a blank or a blank shape in a standard shape of a seat, which can then be adapted in a special processing step to the shape of the buttocks and the preferred sitting position of the rider. This can be undertaken, for example, by lining and padding the seat shell or in turn by use of a moldable material. If the seat shell is composed of a thermoplastic material, the latter can be heated for adaptation to the shape of the buttocks of the rider and can be shaped freely or by means of impression. The application of a second moldable material which can solidify is also possible.

In the first preferred embodiment of the invention, a type of seat surface for the rider can be formed by attaching at least two bands or strips which are attached from the front to the rear bridge element. The bands are typically not tensioned, but rather are tensioned only when a load is applied, i.e., for example, when the rider is sitting in the saddle.

Irrespective of the configuration of the seat, the final seat surface for the rider can be adapted individually to the rider. One possibility of realizing this consists in the provision of a type of blank or the blank shape of the seat shell with a plurality of openings or channels which lead from the back side and/or lower side of said blank, along the surface thereof or in particular through the latter, to the actual seat surface. These can typically be provided in the blank shape by drilling. During the processing of the saddle, the ideally completed and optionally already partially lined saddle tree can then be fixed on the riding animal or on a framework and the blank shape of the seat shell can be covered by a film which is fastened to the edge of the blank shape and sealed and is loose toward the seat surface. The rider for which the riding saddle is being produced can then sit down thereon and the blank shape is filled from its rear side or lower side, through the channels or bores, with a moldable and curable material. This material then adapts itself to the shape of the buttocks and the preferred sitting position of the rider and cures in this state. The materials mentioned above are suitable as moldable and curable material for this method step. In particular, however, a single- or two-component polyurethane foam is suitable. The seat shell adapted in this manner to the rider can then be padded, coated and/or lined.

The riding saddle is typically padded in the regions where the riding saddle rests on the riding animal, i.e. above all in the region of the saddle tree bars, and is undertaken in particular by means of textile, fleece- or felt-like materials, foams, wool or animal pelts.

Finally, the saddle tree or the riding saddle is covered. This is undertaken in a manner known to a person skilled in the art, typically in leather or other materials with similar properties.

Method

The present invention furthermore relates to a method for producing a saddle tree as part of a saddle, in particular for a riding saddle for a riding animal, as has in particular been described previously, comprising the following steps:

- providing a negative mold for saddle tree bars, comprising a continuous layer made of a flexible material and a layer lying thereon made of a flexible material, wherein said layer lying thereon has recessed regions in the shape and position of the subsequent saddle tree bars, and therefore said saddle tree bars can rest on those regions of the back of the animal which are provided for carrying loads;
- placing the negative mold onto the back of the animal, wherein the continuous layer without recessed regions lies between the back of the animal and the layer with the recessed regions, and wherein the position of the negative mold is preferably marked by drawing fixing points on the negative mold and on the back of the animal;
- filling the recessed regions with a moldable material which can solidify,
- pressing the moldable material in the recessed regions onto the back of the animal and solidifying the moldable material, wherein the moldable material is essentially solidified on the back of the animal;

fixing the two saddle tree bars formed from the solidified material in a stable position with respect to each other on the back of the animal.

The two saddle tree bars can also be connected to each other during the production method, i.e. ideally at at least two points in the negative mold, the recesses for the saddle tree bars can be connected to one another by further recesses. As precise a positioning as possible of the saddle tree bars is thereby ensured. During the use of the saddle tree, said temporary connections between the saddle tree bars have to be removed, however, since they would otherwise rest on the spinal column of the animal and would impair the movement.

Since, in the case of many riding or pack animals of the same type, i.e., for example, in the case of horses, the saddle area (those regions of the back of the riding or pack animal which are suitable for carrying loads) lies more or less in the same region of the back, the negative mold can be configured in particular in such a manner that the saddle tree bars fit onto as many of these animals as possible. For example, negative molds can be provided for large and for small horses as standard and fit a majority of the corresponding animals.

In the event that a saddle tree for a saddle for an animal has to be produced with unusual dimensions, the production of a negative mold can be undertaken by the following method steps: placing a copying element, in particular a transparent and flexible film, onto the back of the riding animal such that at least that region of the back of the riding animal on which the riding saddle comes to lie is covered by the copying element;

marking at least two fixing points on the copying element and on the back of the riding animal, in particular in the region of the spinal column of the riding animal;

marking the outlines of two saddle tree bars on the copying element, wherein the outlines of the saddle tree bars are selected in such a manner that the saddle tree bars rest on those regions of the back of the riding animal that are suitable for carrying loads, also called saddle area by a person skilled in the art;

removing the copying element from the back of the riding animal and placing the copying element onto a first layer, the surface of which is dimensioned in such a manner that the markings on the copying element fit onto the first layer;

transferring the fixing points and the outlines of the saddle tree bars from the copying element onto said first layer;

recessing the regions out of the first layer along the marked outlines of the saddle tree bars;

flatly applying a second layer without recessed regions onto the first layer with the recessed regions, wherein the two layers are connected at least in sections to each other via their surfaces.

The method according to the invention is very simple in comparison to other methods which are known from the prior art for manufacturing customized saddle trees and riding saddles, and nevertheless very high fitting accuracy of the saddle is ensured.

The layers which are used in the method are preferably composed of felt, typically wool felt, or of another material having comparable properties, such as, for example, a fleece- or foam-like material, in particular of a synthetic fleece, foam rubber, such as neoprene, or microcellular rubber. The layers, in particular the first layer, is dimensioned with regard to its layer thickness in such a manner that the saddle tree bars which are formed by introducing and curing the moldable material have a thickness which is necessary for the designated use in the saddle tree of a riding saddle. The thickness of the layers is accordingly also dependent on which mechanical properties the moldable material has in the cured state. The layer thickness of the layers, in particular of the first layer, is typically in the range from 2 to 20 mm, in particular 4 to 15 mm, preferably 6 to 10 mm.

The two layers are typically formed from the same material since this is simpler to handle.

The recessing of the regions out of the first layer along the outlines of the saddle tree bars is undertaken, for example, with a cutter, scissors or the like.

In principle, the recessing of the regions along the outlines of the saddle tree bars can also be undertaken when the two layers have already been connected to each other. It should simply be ensured here that only the first layer is cut into, rather than both. This can be undertaken, for example, by adjusting the blade length of a cutter.

The first layer is connected to the second layer, for example, by adhesive bonding, stitching, by means of a touch and close fastener or the like.

Instead of filling the moldable material into the recessed regions, it is also possible in the method described above to cover the negative mold with a film or the like and to inject a moldable material into the cavities produced by the recessing. This variant is suitable especially if a reactive material, i.e., for example, a heat-curing or two-component plastic, is used as the moldable material.

In addition to its function as a negative mold for producing the saddle tree bars, the layers can also serve as padding for the saddle tree bars and therefore preferably remain as part of the saddle after the saddle tree bars are produced. For this purpose, they can be cut into any shape, typically such that they completely enclose the saddle tree bars.

During the production of the saddle tree bars on the back of the riding animal, an additional layer of a padding can be inserted between the second layer and the back of the riding animal, said layer corresponding in particular to the thickness and a flexibility of the padding which is used later and is compressed by the weight of the rider or another load. This ensures that the saddle tree bars are matched as precisely as possible to the back of the riding animal.

The moldable material in the negative mold is pressed on, for example, by a blanket which is placed directly on the riding animal at the point where the saddle later comes to lie over the negative mold with the moldable material and is typically tensioned around the stomach of the riding animal. In order to ensure better pressing on, the blanket can be provided with suitable cords or bands.

In order to ensure particularly optimum pressing on of the saddle tree bars during the production thereof on the back of the riding animal, use can be made here of a device which is produced especially for this purpose and comprises battens, typically wooden battens, which are fastened to one another along the back of the riding animal with some clearance. The battens are fastened to one another, for example with bands, and form a type of slatted frame. Straps or bands are fastened to the outer battens and can be used to fasten the construction around the stomach of the riding animal, in a similar manner to a saddle. Between this construction and the negative mold with the moldable material for producing the saddle tree bars, a type of cushion is inserted which can be filled in situ with air, a liquid or the like. Use is preferably made of an air cushion which can be pumped up. By means of such a construction, the moldable material is pressed in the best possible way onto the riding animal during the production of the saddle tree bars and therefore obtains an optimum shape.

The saddle tree bars pressed in this manner onto the back of the riding animal are solidified in this position, when a thermoplastic material is used, simply by cooling of said material to ambient temperature.

The two saddle tree bars formed from the solidified material are fixed in a stable position with respect to each other on the back of the riding animal typically in that the two saddle tree bars are connected to each other by a temporary connection. Another temporary fixing which is removed again during the further processing of the saddle tree is also conceivable. However, the fixing can also be undertaken by attaching the rear and/or the front bridge element to the saddle tree bars after the molding.

The production method for the saddle tree can be facilitated in that the frame element construction is at least partially premanufactured and as such is connected directly to the two saddle tree bars immediately after the molding thereof or still on the back of the riding animal. The connection can be undertaken here mechanically, for example by adhesive bonding or welding. Suitable connecting points here are at the front or rear bridge element and additionally at the guide elements. In this embodiment, the guide elements are already attached around the first frame elements and are thus provided as connecting points. If the moldable material from which the saddle tree bars are shaped, the material of the rear bridge element and the material which contains the guide elements are a thermoplastic material, the premanufactured rear bridge element together with the frame element construction can simply be attached by heating of the surfaces of the thermoplastic material at the joining points and immediate joining to the saddle tree bars.

Kit of Parts

In the production of the saddle tree according to the invention, it is possible for the individual components of the saddle tree, starting materials or premanufactured components to be provided as a type of kit of parts and for them then to be adapted to the animal and joined together in a method as described above, in particular by a person trained for this purpose.

Such a kit of parts contains in particular a negative mold for the saddle tree bars, moldable material, for example in the form of granules of a thermoplastic material, the individual parts for, or an already premanufactured, frame element construction, optionally comprising a seat shell or a corresponding blank shape thereof, and further optional components which are required for producing the saddle tree or the saddle, for example pads, straps, stirrups, lining material, etc.

If a saddle tree or a saddle is intended to be produced for an animal to which a standardized negative mold does not fit, the kit of parts, in place of the negative mold, comprises the components for the production thereof as described previously, in particular a copying element, i.e. preferably a transparent and flexible film and the material for the layers, for example two layers of a felt material.

An already premanufactured frame element construction is preferably provided here which is then connected in the method described to the saddle tree bars in a subsequent step. Said frame element construction comprises, as already described, a rear and a front bridge element which, optionally and depending on the embodiment of the invention, can be connected to each other, and frame elements, i.e. typically the two first frame elements, which are each connected to a second frame element, and the second frame elements are then likewise each connected to one another by the connecting element. The first and second frame elements are designed here in such a manner that they permit the above-described movability of the saddle tree bars during use of the saddle. This preferably takes place by the second frame elements each comprising a spring element, preferably a gas-filled compression spring, and at least the connection of the first frame elements to the second frame elements and the connection of the second frame elements to the front bridge element taking place via joints. A premanufactured frame element construction is shown, for example, in FIG. 12 and in FIG. 15.

DESCRIPTION OF THE FIGURES

Exemplary embodiments of the invention will be explained in more detail with reference to the figures. Identical elements are provided with the same reference signs in the various figures. Of course, the invention is not restricted to the exemplary embodiments shown and described. The features illustrated in the figures can be found in various embodiments of the invention and can be combined with one another.

FIG. 2B shows a particularly preferred embodiment of the saddle tree, in which, in comparison to FIG. 1C, the second frame elements 8 are spring elements, i.e., for example, gas-filled compression springs, and the third frame element 9 is a combination of a metal rod or the like, which is connected directly to the saddle tree bar, and thermoplastic material which is molded directly onto the saddle tree bar and partially surrounds the metal rod and extends to the connecting element 6 (not shown), which connects the two joints 12 to each other. In this embodiment, that section of the metal rod which protrudes out of the thermoplastic material can serve as a support for the girth rigging and/or the stirrups and the like.

In the case of the saddle tree illustrated here, the rear bridge element 5 is in the form of a blank for a seat for the rider, the third frame element 9 and the connecting element 6 are configured as a single part, and the third frame element 9 and the connecting element 6 are enclosed in the plastic from which the rear bridge element 5 is produced. This embodiment is appropriate since these components of the saddle tree are connected to one another rigidly here and the entire frame element construction is preferably premanufactured. In principle, it is also possible to dispense with metal bars or equivalent reinforcements, as indicated in these figures as third frame elements 9 and connecting element 6 enclosed in a material, if this material permits this for mechanical and processing reasons. In such a case, said seat shell which is formed from a rear and front bridge element and from the third frame elements could be produced from a single material, for example by injection molding, and would merely have to comprise fastening points for the first and second frame elements and for the saddle tree bars.

Figure 1A:
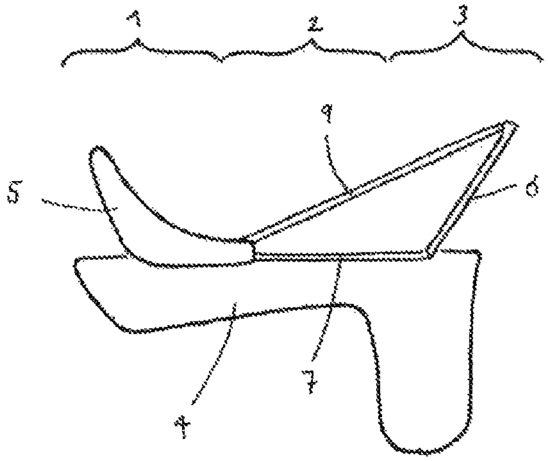
FIG. 1A shows a side view of a saddle tree according to the invention consisting of rear section 1, a middle section 2 and a front section 3. The saddle tree bar 4 extends over the three sections and, in the region of the rear section 1, has a rear bridge element 5 which is designed as a seat shell in this embodiment. From the rear bridge element 5, the first frame element 7 extends along the saddle tree bar 4 from the rear to the front section of the saddle tree and, in the region of the front section 3, is connected to the second frame element 8. The second frame element 8 is in turn connected directly or via a front bridge element (not visible in the figure) to the third frame element 9 which leads back to the rear bridge element 5.
Figure 1B:
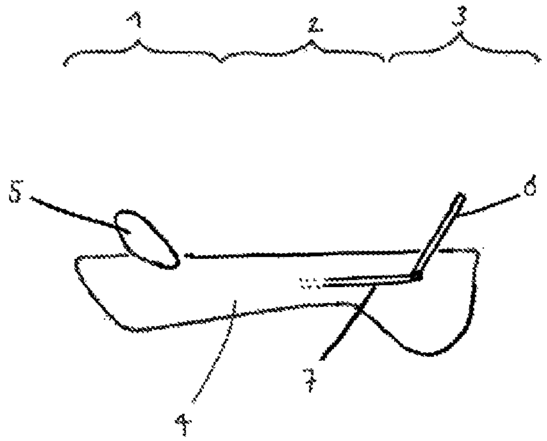
FIG. 1B shows an embodiment in which, in comparison to FIG. 1A, the front and the rear bridge element 5 are not connected to each other and the first frame element 7 is connected to the saddle tree bar 4, and which does not have a third frame element.
Figure 1C:
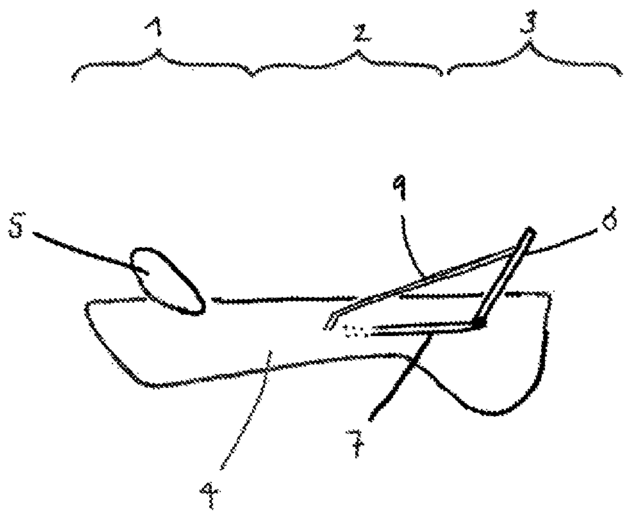
FIG. 1C shows an embodiment of a saddle tree as in FIG. 1B, but which, additionally thereto, comprises a third frame element 9 which is connected to the second frame element 8 and is connected to the saddle tree bar 4 in the region of the middle section 2 of the saddle tree.
Figure 2A:
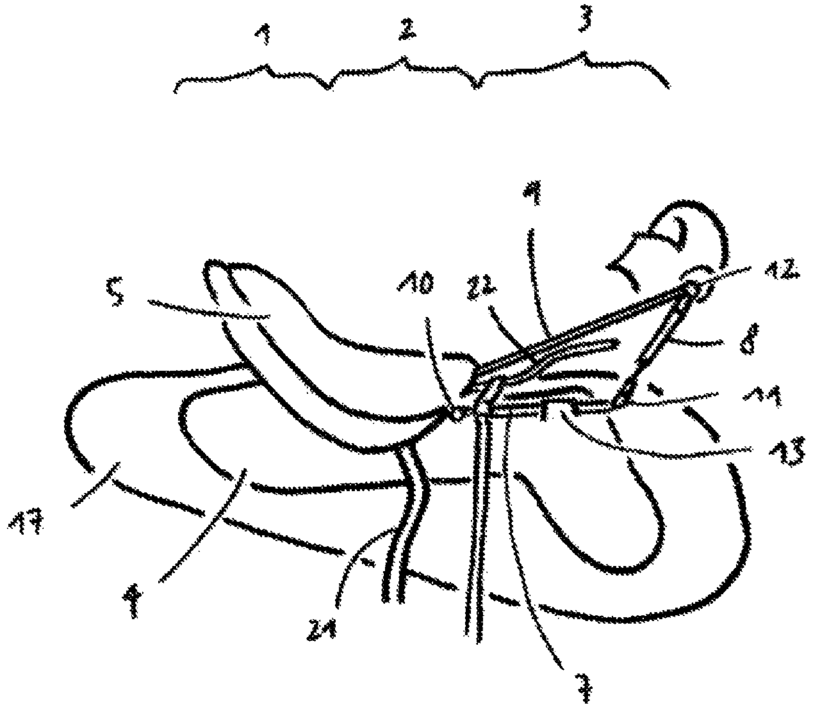
FIG. 2A shows substantially the same view as FIG. 1A, wherein here the first frame element is connected to the rear bridge element 5 via a joint 10. Furthermore, the first frame element 7 extends in the region of the middle section 2 or of the front section 3 of the saddle tree through a guide element 13 fastened directly to the saddle tree bar, and is supported on the saddle tree bar 4 by said guide element 13. The second frame element 8 is illustrated here as a spring element, in particular as a gas-filled compression spring, and is likewise connected to the first frame element 7 via a joint 11. Furthermore, the second frame element 8 is connected via a joint 12 to the front bridge element (not visible in the figure) and the third frame element 9 leads back from said front bridge element to the rear bridge element 5. Also illustrated is the first layer 17, the second layer lies therebelow and is therefore not visible. The layers are cut to fit the saddle tree bars. Likewise illustrated are the girth rigging 21, which is fastened to the rear bridge element 5, and the support for the stirrups 22 with belts for the stirrups.
Figure 2B:
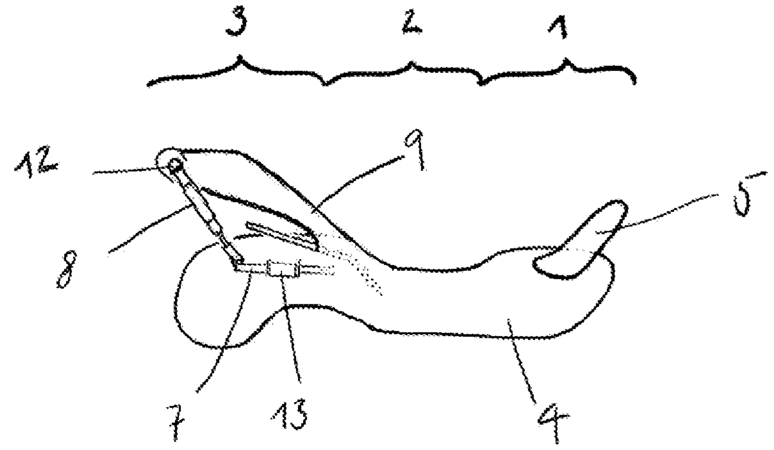
Figure 3:
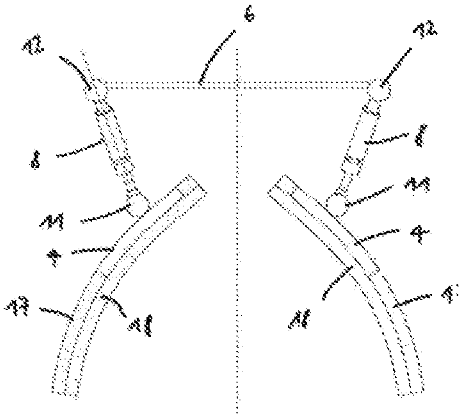
FIG. 3 shows a front view of the saddle tree as illustrated in FIG. 2. The position of the saddle tree bars 4 and the protrusion of the second frame elements 8, which are here in turn depicted as gas-filled compression springs, can be seen therefrom. Also shown is the connecting element 6 which connects the two second frame elements 8 to each other and from which the third frame elements lead back to the saddle tree bars in the middle section of the saddle tree or to the rear bridge element (not shown in the figure). The first and the second layers 17, 18 which surround the saddle tree bars can likewise be seen.
Figure 4:
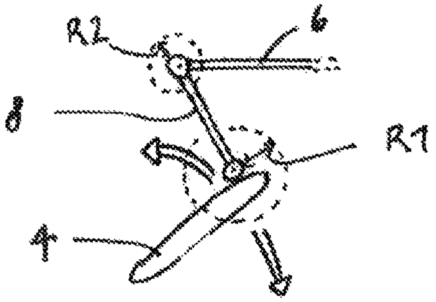
FIGS. 4 and 5 show the operation of the saddle tree in a cutout of the front view (FIG. 4) and in the side view (FIG. 5). The movement of the saddle tree bar 4, as takes place during the use of the saddle tree in a saddle for a riding animal, is indicated by arrows. This movement is transmitted to the frame element construction, wherein the frame elements are selected and designed in such a manner that the radius of movement R1 of the connecting point of the first frame element 7 to the second frame element 8 during movements which are produced by the riding animal in the region of the supporting surface of the saddle tree bars 4 on the back of the riding animal is greater than the radius of movement R2 of the connecting point of the second frame element 8 to the connecting element 6.
Figure 5:
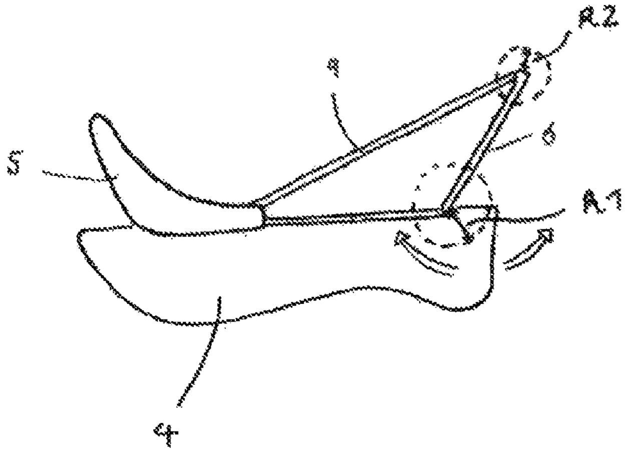
Figure 6A:
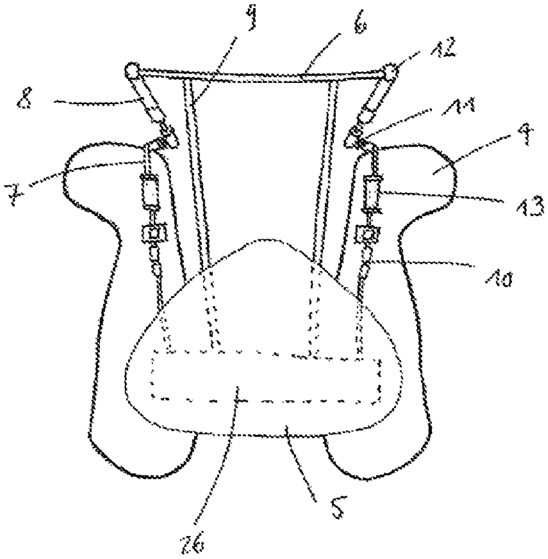
FIG. 6A shows a view from above of the saddle tree, from which, in addition to the previously described figures, the connecting element 6 and the third frame elements 9 can be seen. A reinforcement 26 which is integrated in the rear bridge element 5 can furthermore be seen in this figure. As already described above, in the embodiment shown here, the first and the third frame elements 7 and 9 are connected directly or indirectly, i.e. via threaded sleeves and/or joints, to said reinforcement 26. In the case illustrated, the reinforcement could basically also be the rear bridge element as such. In this case, the rear bridge element illustrated would simply be a seat shell.
Figure 6B:
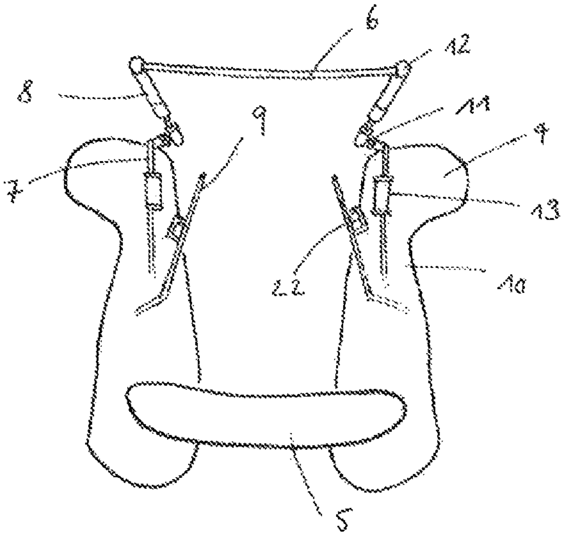
FIG. 6B corresponds substantially to the illustration from FIG. 6A, the third frame elements 9 do not lead here back into the rear bridge element 5, but rather into the saddle tree bars 4 in the middle section of the saddle tree. In a preferred embodiment of that shown here, the third frame elements 9 and the connecting element 6 are at least partially surrounded with thermoplastic material, corresponding to that of the saddle tree bars, and the frame elements 9 and the connecting element 6 are connected to each other via said thermoplastic material. Such a preferred embodiment is illustrated in the form of a side view in FIG. 2B.
Figure 7:
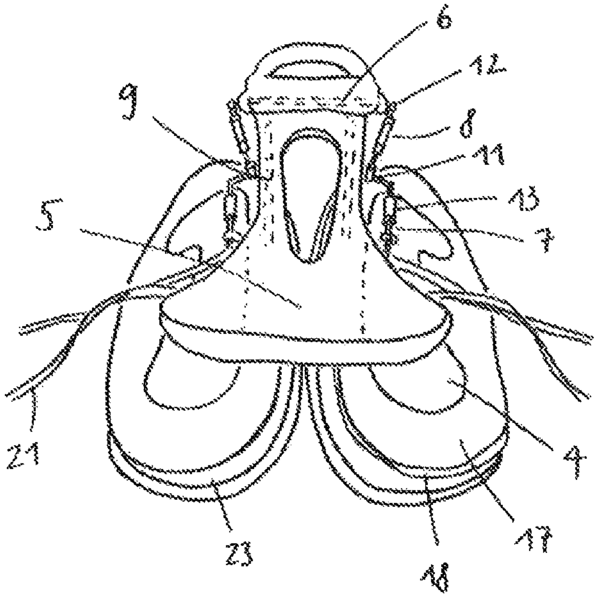
FIG. 7 and FIG. 8 each show a perspective view of a saddle tree according to the invention which comprises all the essential components which are necessary for the further processing to form a riding saddle, typically for a horse. In addition to the components described previously, the saddle tree already has a padding 23 which lies between the saddle tree bars 4 and the back of the riding animal during use of the saddle tree.
Figure 8:
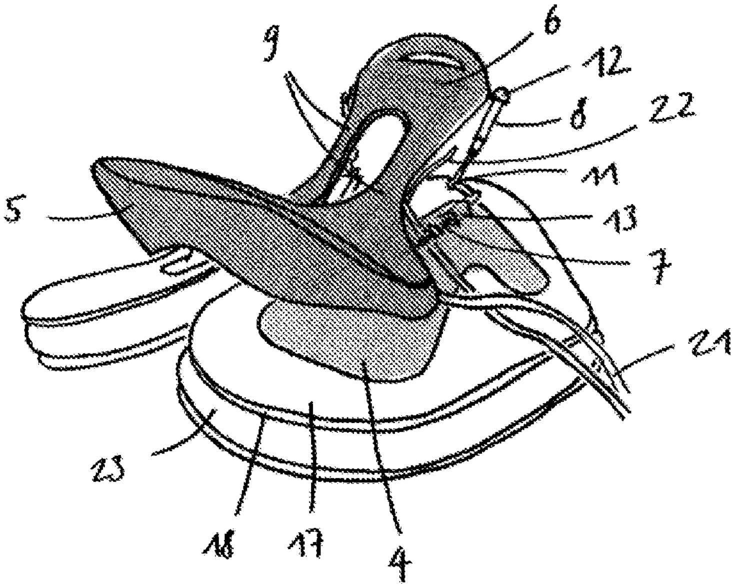
Figure 9:
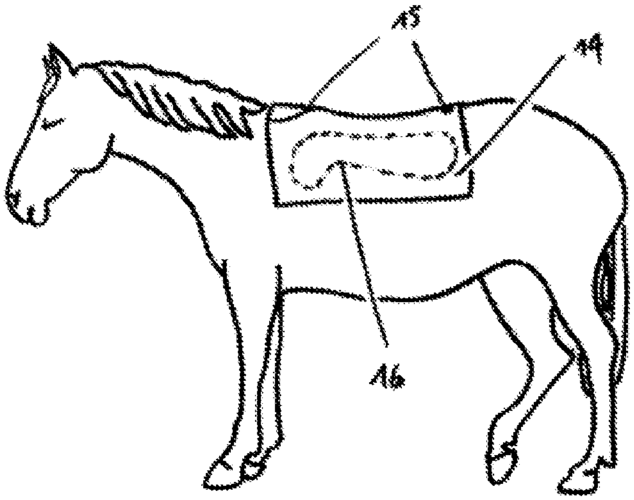

FIG. 9 shows a side view of a horse on which the method for producing a saddle tree is being carried out. The horse is illustrated with the negative mold 14 placed on its back, wherein said negative mold is placed at the location where the riding saddle is also intended to come to lie, and particular care should be taken to ensure that the recesses for the saddle tree bars lie in the region of the saddle area of the horse. Two fixing points 15 are drawn on the negative mold 14, with said fixing points also being marked on the back of the horse. This is important so that the saddle tree can be correctly placed later and sits optimally. Furthermore, the outlines 16 of the saddle tree bars are shown.

Figure 10:
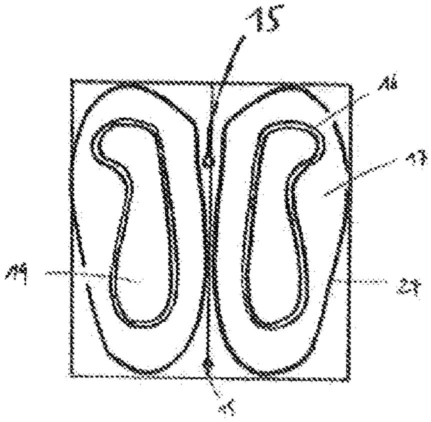

FIG. 10 shows a negative mold comprising the first layer 17 with the recesses 19 which have been made along the drawn outlines 16 of the saddle tree bars. The layers can have any desired shape as long as they enable the outlines of the later saddle tree bars to be included.

FIG. 10 furthermore shows a section line 24 which leads around the saddle tree bars. Said section line is optional and the layers 17 and 18 can be cut along it later in the method so that the saddle later does not cover too large an area of the horse, or for esthetic reasons. However, until the saddle tree bars have been fixed with respect to each other formed in a correct position matching the back of the horse, for example by temporary connections of thermoplastic material or with at least one of the two bridge elements, the layers should not be severed along their mirror plane since otherwise the fixing points and the correct position of the saddle tree bars are lost.

Figure 11:
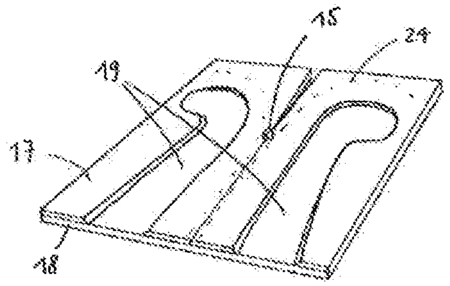

FIG. 11 shows a perspective view of a cross section through a negative mold, with the first layer 17, the second layer 18, a fixing point 15 and the recesses 19. The first and the second layer 17 and 18 are connected to each other here. This connection can be undertaken over the entire area of the layers or only at points or in partial regions. It can readily be seen in FIG. 11 that the two layers 17 and 18 together form a negative mold into which the moldable material for producing the saddle tree bars can be filled.

The negative mold, produced as shown in FIGS. 10 and 11, for the saddle tree bars, comprising the layers 16 and 17 which are connected to each other at least in sections, is then placed on the back of the horse, and the fixing points 15 are drawn on the back of the horse. It is thereby ensured that the later saddle also lies optimally on the back of the horse.

The recessed regions 19 are then filled with a moldable material which can solidify. Alternatively, the recessed regions 19 can also first be filled with a moldable material and then placed on the back of the horse. As already described, the placing on also has to be undertaken here in such a manner that the recessed regions 19 come to lie along the outlines 16 of the saddle tree bars in such a manner that the saddle tree bars rest on the saddle area, and wherein the second layer 17 without recessed regions lies between the back of the riding animal and the first layer 16 with the recessed regions.

The moldable material in the recessed regions is then pressed against the back of the riding animal and solidifies substantially in this position. The solidification should be undertaken here on the back of the horse to an extent such that the saddle tree bars are dimensionally stable upon removal.

On the back of the riding animal, the two saddle tree bars formed from the solidified material are fixed in a stable position with respect to each other and can then be removed from the back of the horse.

Figure 12:
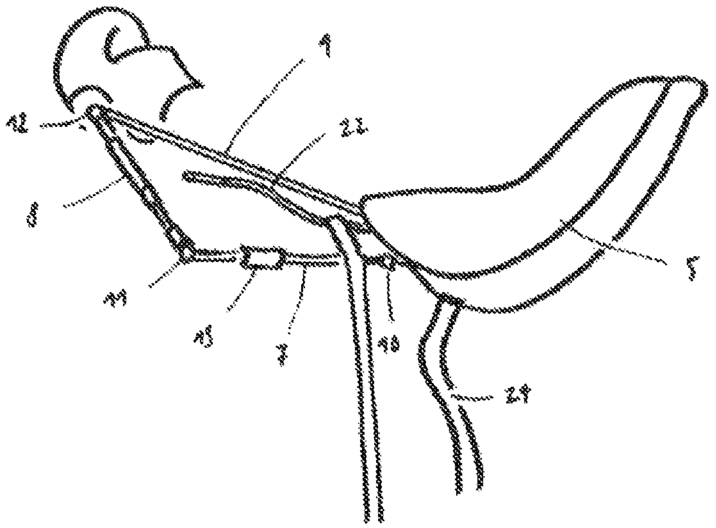

FIG. 12 shows a side view of a frame element construction 20, as is typically used as a premanufactured component during the production of a saddle tree according to the invention. It has all of the components already described previously.

Figure 13:
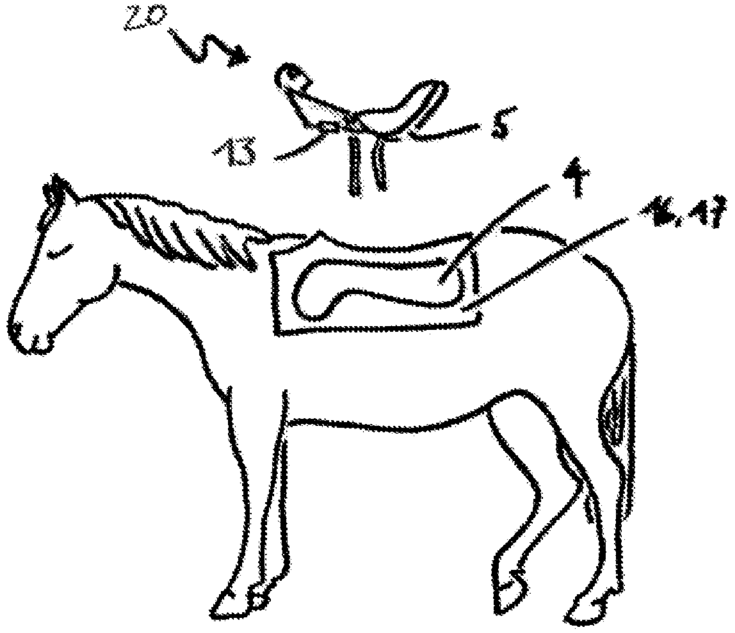

FIG. 13 shows the step of fixing the saddle tree bars 4 formed on the back of the horse, by application of the frame element construction 20. The latter is placed onto the saddle tree bars 4 and the layers 16 and 17 and any further components, such as padding (not illustrated), and are aligned there and fastened thereto.

In an embodiment in which the saddle tree bars 4, the rear bridge element 5 and the guide eyelets 8 are formed from the same thermoplastic material, the latter, for fastening the frame element construction 20 to the saddle tree bars 4, can be heated at points at said locations, for example with a hot air gun or a solder device, and the parts can then be connected in an integrally bonded manner by bringing them together.

Figure 14:
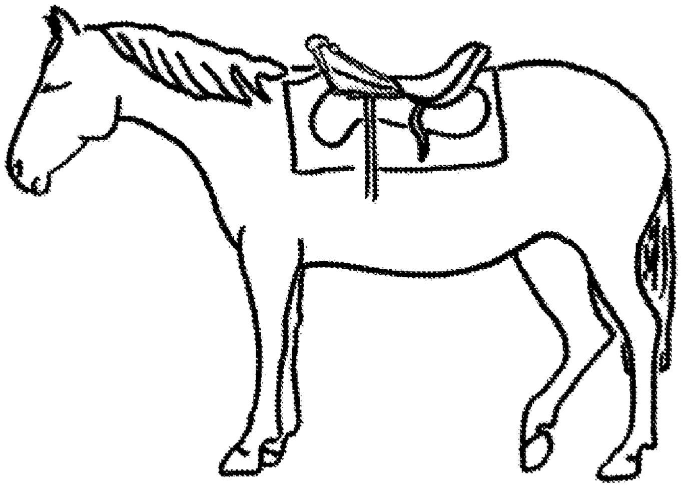

FIG. 14 finally shows the completed saddle tree on the horse.

Figure 15:
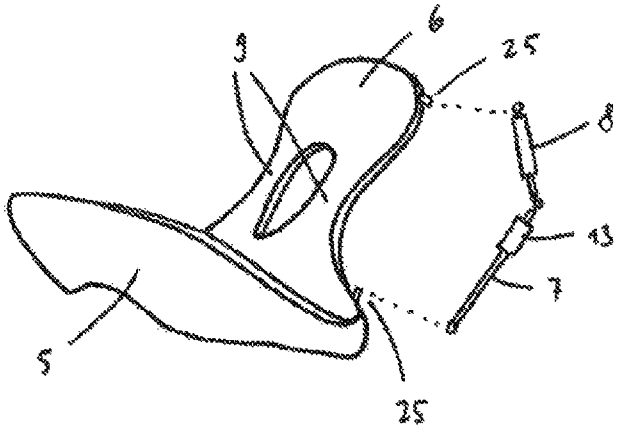

FIG. 15 shows a typically premanufactured component of the saddle tree, comprising the rear bridge element 5, the two third frame elements 9 and the front bridge element 6 in a single-part configuration. Said premanufactured component can have reinforcing elements, for example made of metal, in its interior, but can also be manufactured from a single material. At the locations at which the first frame element 7 with the guide eyelet 13 and the second frame element 8 are intended to be attached to the premanufactured component, the latter can have threaded sleeves 25. The dashed lines show the connecting points at which the first and second frame element are fastened to the premanufactured component.

REFERENCE SIGNS

1 Rear section of the saddle tree
2 Middle section of the saddle tree
3 Front section of the saddle tree
4 Saddle tree bar
5 Rear bridge element
6 Connecting element
7 First frame element
8 Second frame element
9 Third frame element
10 Joint
11 Joint
12 Joint
13 Guide eyelet
14 Negative mold
15 Fixing point
16 Outline
17 First layer
18 Second layer
19 Recessed regions
20 Frame element construction
21 Girth rigging
22 Support for stirrups
23 Padding
24 Section line
25 Threaded sleeve
26 Reinforcement
R1 Radius
R2 Radius

The invention claimed is:

1. A saddle tree for a saddle, having a rear section, a middle section and a front section which is formed substantially mirror-symmetrically with respect to a plane of symmetry oriented in the longitudinal direction;

comprising two saddle tree bars each having an inner side for placing onto the back of an animal and an outer side, which project from the rear section of the saddle tree through the middle section into the front section, and a frame element construction which has (i) a rear bridge element which connects the two saddle tree bars to each other in the rear section, and (ii) a front bridge element which connects the two saddle tree bars to each other in the front section, the front bridge element being attached to each of the two saddle tree bars via one or more spring elements, wherein the connection of the saddle tree bars via the rear bridge element is substantially rigid and, in comparison to the connection via the rear bridge element, the connection of the saddle tree bars via the front bridge element is movable such that the saddle tree bars in a region of the front section are deflectable, by bending and/or torsion, out of a rest position defined with respect to a region of the saddle tree bars which is located in the rear section of the saddle tree.

2. The saddle tree as claimed in claim 1, wherein the rear bridge element and the front bridge element are not directly connected to each other via frame elements, wherein the front bridge element comprises two first frame elements which are each connected to a respective one of the saddle tree bars in a region of the middle section of the saddle tree and lead along the respective one of the saddle tree bars toward the front section or beyond the latter and are supported in the front section of the saddle tree on the respective one of the saddle tree bars, and wherein the front bridge element further comprises two second frame elements which each protrudes from an outer side of a respective one of the saddle tree bars, and each of the first frame elements is connected in the front section of the saddle tree or in an extension thereof to a respective one of the two second frame elements, and the two second frame elements are connected to each other via a connecting element.

3. The saddle tree as claimed in claim 2, wherein the second frame elements comprise the spring elements.

4. The saddle tree as claimed in claim 2, wherein the two second frame elements each protrudes from the outer side of the respective one of the saddle tree bars in a direction that extends away from the plane of symmetry.

5. The saddle tree as claimed in claim 4, wherein the connecting element is connected at one side to an end of one of the two second frame elements and is connected at another side to an end of the other one of the two second frame elements.

6. The saddle tree as claimed in claim 2, wherein the connecting element has a longest dimension that extends in a direction that is transverse to the plane of symmetry.

7. The saddle tree as claimed in claim 1, wherein the rear bridge element and the front bridge element are connected to each other via frame elements, wherein the frame element construction has at least six frame elements, wherein in the rear section of the saddle tree, in each case on each side of the rear bridge element, two first frame elements are connected to the rear bridge element and each lead along the saddle tree bars toward the front section of the saddle tree or beyond the latter and are supported in the front section of the saddle tree on the saddle tree bars, and wherein each of the first frame elements is connected in the front section of the saddle tree or in an extension thereof to a second frame element which protrudes from the outer side of the saddle tree bar, and the two second frame elements are connected to each other via a connecting element, and wherein, starting from the front bridge element, two third frame elements lead back into the rear bridge element and are connected to the latter.

8. The saddle tree as claimed in claim 1, wherein the saddle tree bars are flexible, and therefore they remain substantially in contact with the animal during movements which are produced by an animal in the region of the supporting surface of the saddle tree bars on the back of the animal.

9. The saddle tree as claimed in claim 1, wherein the saddle tree bars are formed from a thermoplastic material.

10. The saddle tree as claimed in claim 1, wherein the saddle tree bars and the rear bridge element are formed from an identical material and are connected to each other in an integrally bonded manner.

11. The saddle tree as claimed in claim 1, wherein the rear bridge element comprises a seat shell or is designed as a seat shell.

12. The saddle tree as claimed in claim 1, wherein the saddle tree bars in the middle section are also deflectable, by bending and/or torsion, out of the rest position.

13. The saddle tree as claimed in claim 1, wherein the front bridge element is attached to each of the two saddle tree bars via two spring elements such that the front bridge element is attached to one of the two saddle tree bars via one of the two spring elements and the front bridge element is attached to the other one of the two saddle tree bars via the other one of the two spring elements.

14. The saddle tree as claimed in claim 13, wherein the two spring elements are compression springs.

15. The saddle tree as claimed in claim 1, wherein the one or more spring elements include a compression spring.

16. A saddle comprising a saddle tree as claimed in claim 1.

17. A saddle as claimed in claim 16, wherein the saddle is a riding saddle, additionally comprising a seat for the rider or a device for securing other loads, a padding in the regions which are in contact with a riding animal and/or a rider, mechanical fastening elements for girth rigging and stirrups and/or a covering of the saddle with a cover and/or decorative elements.

* * * * *